(No Model.)

G. W. NAYLOR.
BELL CORD ATTACHMENT.

No. 383,587. Patented May 29, 1888.

WITNESSES:
W. R. Davis.
C. Sedgwick.

INVENTOR:
G. W. Naylor
BY Munn & Co
ATTORNEYS.

UNITED STATES PATENT OFFICE.

GEORGE W. NAYLOR, OF JERSEY CITY, NEW JERSEY.

BELL-CORD ATTACHMENT.

SPECIFICATION forming part of Letters Patent No. 383,587, dated May 29, 1888.

Application filed August 24, 1887. Serial No. 247,735. (No model.)

*To all whom it may concern:*

Be it known that I, GEORGE W. NAYLOR, of Jersey City, in the county of Hudson and State of New Jersey, have invented a new and Improved Bell-Cord Attachment, of which the following is a full, clear, and exact description.

My invention relates to an improvement in bell-cord attachments, specially adapted for use in street-cars, and has for its object to provide a means whereby the bell-cord of a car may be readily, expeditiously, and conveniently manipulated from the seat.

The invention consists in pivoting a lever to the window-frame and in securing one end of said lever to the bell-cord, and also in the construction and operation of the several parts, as will be hereinafter fully set forth, and pointed out in the claims.

Reference is to be had to the accompanying drawings, forming a part of this specification, in which similar letters of reference indicate corresponding parts in both the figures.

Figure 1:
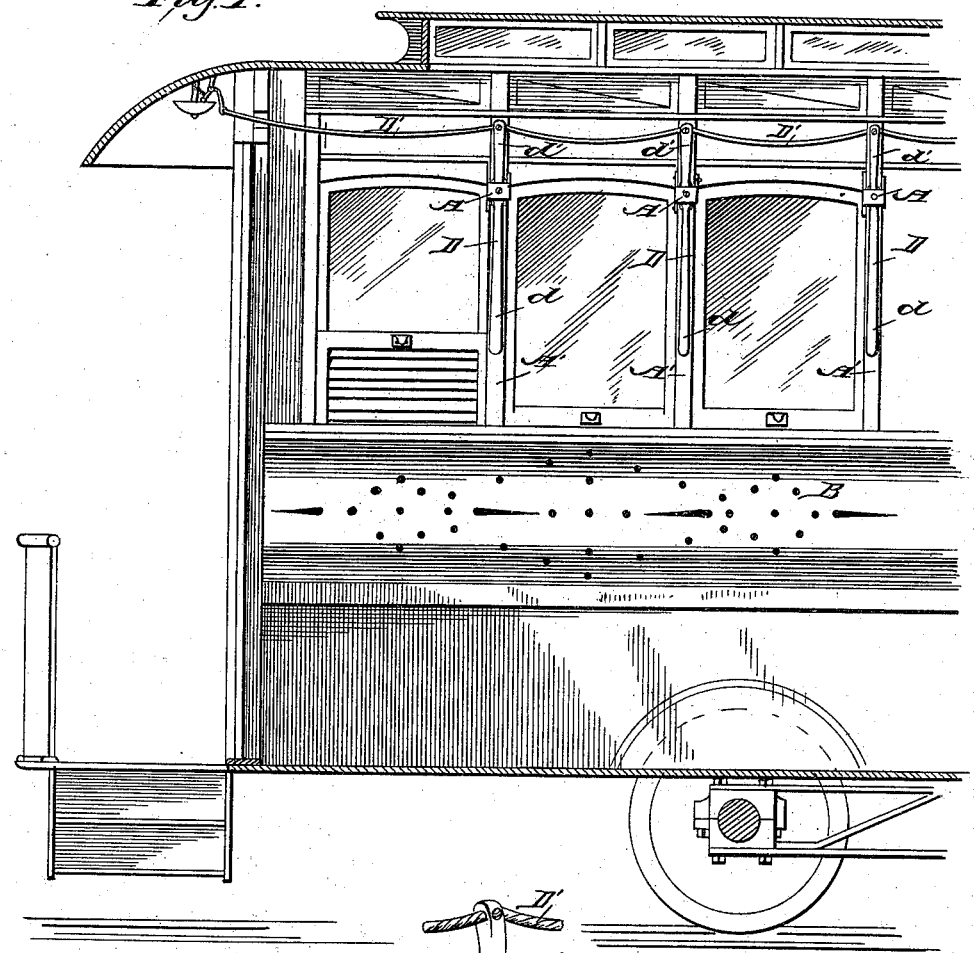
Figure 2:
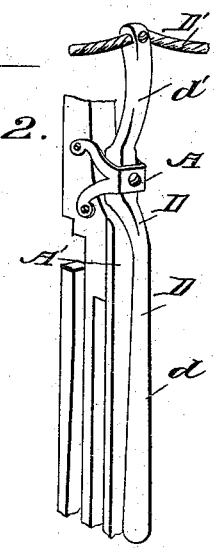

Figure 1 is a partial longitudinal and vertical section through a car having my improvement attached, and Fig. 2 is a perspective view of the same.

In carrying out the invention a U-shaped bracket, A, is secured to the upper portion of the vertical sides A' of the window-frame, upon the inner side of the car B, the said bracket being attached by screw or other equivalent fastening device passed through the extremities of the members into the frame, as shown in Fig. 2.

To the inner side of the horizontal portion of the bracket A a lever, D, is pivoted, adapted to have lateral motion which lever from its pivotal point downward is curved to correspond with the contour of the frame immediately beneath it, terminating in a handle, $d$, within convenient reach from the seat. The upper portion, $d'$, of the lever is curved inwardly and upwardly, and provided at its extremity with an aperture through which the bell-rope D' is passed, the said rope being rigidly secured within the aperture in any approved manner.

In operation, as shown in Fig. 1, a lever is pivoted between each of the windows, the lever upon one side of the car being secured to one bell-rope and those upon the opposite side to another, both ropes leading to the same bell; or, if the one rope is made to extend upon each side, the levers upon both sides are attached thereto.

It will be observed that by simply carrying the handle of any lever either in the direction of the front or rear of the car an alarm will be immediately sounded upon the bell.

I do not confine myself to the application of the attachment to cars alone, as it is applicable to any form of conveyance in which a signal bell and a cord are employed.

Having thus described my invention, what I claim as new, and desire to secure by Letters Patent, is—

1. The combination, with a railway-car or similar vehicle and the bell-cord, of a lever or series of levers pivoted between the windows, having lateral motion, the upper end of which lever or levers is secured to the bell-cord, the lower constituting a handle to manipulate the same, as and for the purpose herein set forth.

2. The combination, with a car or similar conveyance and the bell-rope, of a lever pivoted in a bracket attached between the windows, the lower end of which is extended downward in the direction of the seat to constitute a handle, the upper end being curved upward and inward and secured to the bell-rope, substantially in the manner and for the purpose herein set forth.

GEORGE W. NAYLOR.

Witnesses:
 J. F. ACKER, Jr.,
 C. SEDGWICK.